May 20, 1969  A. SCHEITERLEIN  3,444,845

INTERNAL COMBUSTION ENGINE

Filed Feb. 3, 1967

Inventor
A. Scheiterlein
By Watson, Cole, Grindle & Watson
Attys.

United States Patent Office 3,444,845
Patented May 20, 1969

3,444,845
INTERNAL COMBUSTION ENGINE
Andreas Scheiterlein, Graz, Austria, assignor to Hans
List, Graz, Austria
Filed Feb. 3, 1967, Ser. No. 613,812
Claims priority, application Austria, Feb. 23, 1966,
A 1,681/66
Int. Cl. F02b 29/04; F01p 3/02
U.S. Cl. 123—41.82   4 Claims

ABSTRACT OF THE DISCLOSURE

An exhaust turbosupercharged internal combustion engine is provided with two separate cooling-water systems. One system services the engine head and supercharger aftercooler whereas the other system services the engine block.

---

Figure 1:
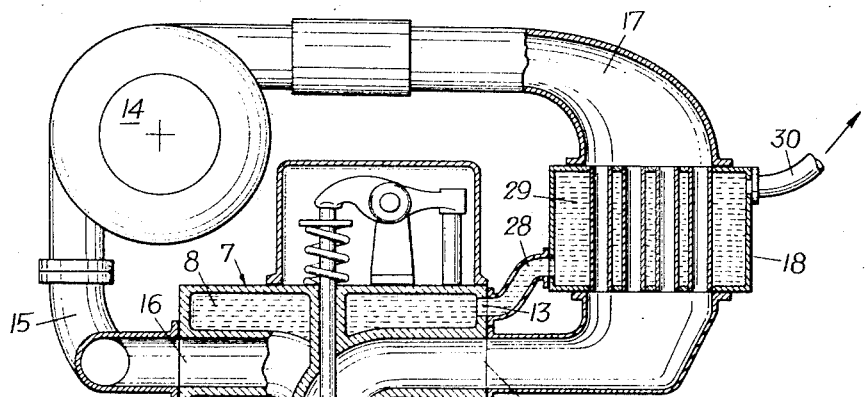

The invention relates to an internal combustion engine comprising a water jacket surrounding the cylinder block and water-carrying cavities in the cylinder head.

The cooling of the cylinder head which is the element of the engine subject to the highest thermal stress, generally confronts the designer of high-powered internal combustion engines, such as heavy-duty engines with turbosuperchargers, with an extremely difficult problem. In conventional water-cooled internal combustion engines the cooling-water circulation system usually comprises a thermostat which serves to maintain the temperature of the cooling water in the area of the combustion chamber walls on a uniform level of about 85 to 95° C. (185 to 203° F.). This temperature range has proved particularly suitable in actual practice, particularly for avoiding premature wear of the cylinder liners. On the other hand, this relatively high temperature level is objectionable insofar as it already permits the formation of steam bubbles in the cooling water resulting in a frequently considerable reduction of the heat transfer coefficient. The cooling water passing from the water jacket surrounding the engine cylinder into the cylinder head carries as a rule an already substantial proportion of steam bubbles so that the formation of steam bubbles in the cylinder head already subject to high thermal stress is further increased. The high temperature of the cooling water inside the cylinder head precludes dissolution of the steam bubbles thus formed so that in many cases a dangerous steam film is subsequently formed at the bottom of the cylinder head, causing increased boiler-scale formation precisely in such places as are subject to particularly high thermal stress. As a result, the exchange of heat between the hot cylinder head walls and the cooling water is further impaired. The formation of cracks in the area of the valve webs and permanent deformation of the cylinder head walls adjoining the combustion chamber are frequently direct consequences of these unsatisfactory cooling conditions.

It is the object of the invention to provide an effective remedy from these shortcomings and difficulties in connection with conventional water-cooled internal combustion engines and to obtain substantially improved cooling conditions for the elements of the internal combustion engine subject to particularly high thermal stress, by such measures as are generally applicable. According to the invention, this problem is solved by providing a separate cooling-water system each for the cooling-water supply of the water jacket and for that of the water-carrying cavities of the cylinder head. Consequently, it will be possible for the temperature of the cooling water to be kept on a low level in the areas subject to high thermal stress in order to prevent the formation of steam bubbles and to intensify the heat exchange with the cooling water. Since the two cooling-water systems are independent from one another, the cooling-water temperature in the water jacket surrounding the cylinder liners can also be maintained on a level unlikely to cause premature wear of the cylinder liners. Consequently, the invention affords ample leeway for the adaption of temperature conditions in the cooling system to the peculiarities of different types of engines to a considerable degree. In several instances, particularly in the case of large-sized engines, the cooling system may be separated according to the invention also at a later stage, the necessary structural changes of the cylinder block design being substantially confined to the closing of overflow apertures between the water jacket of the crankcase and the cavities of the cylinder head as well as the provision of the required connecting bores.

According to another feature of the invention each cooling-water system can be conveniently equipped with its own water pump and if necessary, with a special cooling-water temperature regulator, such as for example, a short-circuit thermostat. As a result, cooling conditions can be controlled separately for each of the two cooling systems, thereby permitting both the control of the velocity of circulation of the cooling water and of the temperature of response of the thermostat. Separate coolers will preferably be provided for the recooling of water for the two cooling-water systems, the cooler associated with the cooling-water system of the cylinder head being generally dimensioned in such a manner as to provide for this cooling system a lower water temperature than the one prevailing in the water jacket surrounding the engine cylinders.

According to a further feature of the invention as applied to an internal combustion engine equipped with an exhaust turbosupercharger, the supercharger air cooler is included in the cooling-water system of the cylinder head in such a manner that the water inlet of the supercharger air cooler follows the cooling-water outlet of the cylinder head. As a rule, a separate cooling circuit is provided for the supercharger air cooler in order to ensure effective recooling of the supercharger air. In addition to the lower structural expense involved, the combination of the cooling system of the cylinder head with that of the supercharger air cooler offers a further advantage insofar as the intake air recooled in the supercharger air cooler is partly further recooled in the area of the valve ports of the cylinder head. With engines of conventional design, however, objectionable reheating of the air which had been recooled in the supercharger air cooler occurs generally within the intake valve ports due to the fact that the wall temperature within the cylinder head is higher than the temperature of the supercharger air because of the high cooling-water temperature in the cylinder head. In conventional engines the effect of the supercharger air cooler is thus partly canceled.

According to the invention the supercharger air cooler and the cylinder head can be combined so as to form a single structural unit wherein the water outlet of the cylinder head terminates directly in the water inlet of the supercharger air cooler. This design ensures extreme compactness and simplifies the layout of the air and cooling water ducts as a result of the suppression of pipe and/or hose connections between the cylinder head and the supercharger air cooler as would be otherwise required. With regard to the design of the combined cylinder head and supercharger air cooler assembly any person skilled in the art is offered the possibility of taking the particular requirements of any given type of engine fully into account. For example, it will be possible to adopt the known solution of connecting the supercharger air cooler with the intake manifold of the engine.

Figure 2:
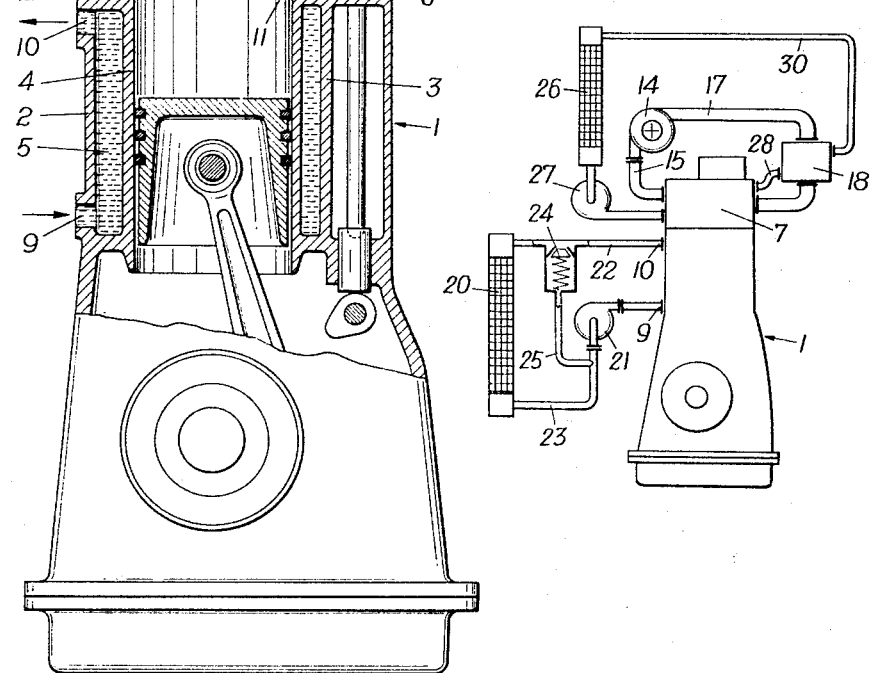

Further details of the invention will appear from the following description of an embodiment of the invention with reference to the accompanying drawing in which FIG. 1 is a partial cross-sectional view of an internal combustion engine according to the invention, and FIG. 2 schematically illustrates the water-cooling system of the internal combustion engine shown in FIG. 1.

The crankshaft housing 1 of conventional design comprises a cooling-water jacket 5 located between the housing walls 2 and 3 and the cylinder liner 4. Likewise, the cylinder head 7 screwed on with a interposition of a cylinder head gasket 6 is of an essentially conventional design comprising cooling-water-carrying cavities 8. In contrast to the conventional design, the embodiment of the invention shown in the drawing lacks overflow apertures between the water jacket 5 of the crankshaft housing 1 and the water-carrying cavities 8 of the cylinder head 7. Valve control as well as other details of the machine which are not essential for the scope of the present invention are the same as with conventional types of engines and have not therefore, been described in this specification.

The left housing wall 2 of the crankshaft housing 1 presents in addition to the usual cooling-water inlet 9 a cooling-water outlet 10 emerging from the upper portion of the water jacket 5. In a similar manner, the cylinder-head 7 also has a lateral cooling-water inlet 12 close to the cylinder head bottom 11 and in the opposite outer wall a colling-water outlet 13 located on a higher level.

The internal combustion engine shown in the drawing is a heavy-duty engine comprising an exhaust turbosupercharge 14 connected with the exhaust valve port 16 via a connecting pipe 15. The compressor section of the said turbosupercharger communicates with the intake valve port 19 via a connecting pipe 17 with a supercharger air cooler 18 inserted inbetween.

The internal combustion engine features two separate cooling-water systems, one of which serves to deliver cooling water to the water jacket 5 and th other for the supply of cooling water to the cylinder head 7 and the supercharger air cooler 18.

The first-mentioned cooling water system which is destined for the cooling of the engine cylinders exclusively, constitutes as self-contained water circulation system with its own water cooler 20 and water pump 21. On the one hand, the cooler 20 communicates with the cooling water outlet 10 via a piping 22 and on the other hand, via a piping 23 comprising the water pump 21 inserted in between with the cooling water inlet 9 on the crankshaft housing 1. A by pass pipe 25 controlled by means of a short-circuit thermostat 24 is also inserted between the pipings 22 and 23. By means of the short-circuit thermostat 24 the water temperature in the water jacket 5 can be regulated so as to obtain a uniform temperature unlikely to cause the premature wear of the cylinder liners.

The second cooling water system associated with the cylinder head 7 and the supercharger air cooler 18 also comprises a self-contained water circulation system with its own water cooler 26 and water pump 7. The water pump 27 delivers the water which has been recooled in the cooler 26 via a connecting pipe 28 to the cylinder head 7 from where it flows via a connecting pipe 28 into the water chamber 29 of the supercharger air cooler 18. On the other hand, the water chamber 29 communicates via another connecting pipe 30 with the water cooler 26. Obviouly, a thermostat control can also be provided for this second cooling water circulation system, so as to be able to regulate the cooling water temperature in the cylinder head 7 according to requirements. As the cylinder head 7, and in particular the bottom 11 of the cylinder head, are the elements of the internal combustion engine which are subject to the highest thermal stress, the cooling-water temperature in the second cooling water system will as a rule, be kept at a lower level than the temperature of the cooling system for the engine cylinders. A low cooling water temperature in the cavities 8 of the cylinder head 7 not only prevents the formation of steam bubbles, particularly in the area of the cylinder head bottom 11, but at the same time also increased boiler-scale deposits precisely in these particularly threatened areas. As a result, heat transfer condition in the area of the cylinder head 7 are greatly improved so that otherwise frequent crack formations in the area of the valve webs are avoided even in heavy duty engines. In addition, moderate water temperatures within the cylinder head 7 offers the advantage that the air precooled in the supercharger air cooler 18 is generally further cooled, at any rate not heated again, in the area of the suction port.

For the recooling of the cooling water, water-water-heat exchangers are used occasionally, such as for example, for stationary and marine engines, or air-water-heat exchangers, especially for vehicle engines. The coolers can be arranged either separately or combined so as to form a homogeneous cooling block.

However, it is also possible within the scope of the present invention to combine both cooling-water systems by the provision of an intermediate cooler between the cooling-water outlet 10 of the crankshaft housing 1 and the cooling-water inlet 12 of the cylinder head 7 so as to constitute a single water circulation system. Moreover there is no limitation with regard to the design of the elements controlling the water temperature in the two cooling systems.

I claim:

1. A water-cooled internal combustion engine comprising a water jacket surrounding the cylinder block of the engine and inserted in a cooling-water system of a water cooler, a hollow cylindrical head including water-carrying cavities inserted in a second cooling-water system distinct from the first-mentioned cooling-water system, the second cooling-water system being associated with another water cooler, an exhaust turbosupercharger, a supercharger air cooler following the said exhaust turbosupercharger and inserted in the said cooling-water system of the cylinder head, the water inlet of the said supercharger air cooler being connected with a cooling-water outlet of the cylinder head.

2. An internal combustion engine as claimed in claim 1, in which a separate water pump is provided for each of the said cooling-water systems.

3. An internal combustion engine as claimed in claim 1, in which a separate cooling-water temperature control member is provided for each of the two cooling-water systems.

4. An internal combustion engine as claimed in claim 3, wherein a short-circuit theremostat is provided for the control of the cooling-water temperature.

References Cited

UNITED STATES PATENTS 1,838,436  12/1931  Morrill _____ 123—41.82

FOREIGN PATENTS 877,557  9/1961  Great Britain.

WENDELL E. BURNS, *Primary Examiner.*

U.S. Cl. X.R.

60—13; 123—41.29, 41.31